(12) United States Patent
VanBlon et al.

(10) Patent No.: US 10,530,927 B2
(45) Date of Patent: Jan. 7, 2020

(54) MUTED DEVICE NOTIFICATION

(71) Applicant: Lenovo (Singapore) Pte. Ltd., Singapore (SG)

(72) Inventors: Russell Speight VanBlon, Raleigh, NC (US); Arnold S. Weksler, Raleigh, NC (US); John Carl Mese, Cary, NC (US); Nathan J. Peterson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 910 days.

(21) Appl. No.: 14/276,614

(22) Filed: May 13, 2014

(65) Prior Publication Data

US 2015/0334497 A1    Nov. 19, 2015

(51) Int. Cl.
| | | |
|---|---|---|
| *H04M 3/428* | (2006.01) | |
| *H04R 29/00* | (2006.01) | |
| *G10L 17/22* | (2013.01) | |
| *G10L 17/00* | (2013.01) | |
| *G10L 25/78* | (2013.01) | |
| *H04M 1/60* | (2006.01) | |
| *H04M 1/725* | (2006.01) | |

(52) U.S. Cl.
CPC .......... *H04M 3/4285* (2013.01); *G10L 17/22* (2013.01); *H04R 29/001* (2013.01); *G10L 17/00* (2013.01); *G10L 25/78* (2013.01); *H04M 1/6008* (2013.01); *H04M 1/72519* (2013.01); *H04M 3/428* (2013.01)

(58) Field of Classification Search
None
See application file for complete search history.

(56) References Cited

U.S. PATENT DOCUMENTS

| | | | | |
|---|---|---|---|---|
| 6,870,919 | B2 * | 3/2005 | Dobler | H04M 1/247 379/163 |
| 8,467,524 | B1 * | 6/2013 | Lee | H04M 1/2471 379/388.02 |
| 8,620,653 | B2 * | 12/2013 | Cutler | G10L 25/78 379/202.01 |
| 8,878,678 | B2 * | 11/2014 | Liu | H04M 1/6008 340/500 |
| 9,203,979 | B1 * | 12/2015 | Jaccino | H04M 19/04 |
| 2006/0280295 | A1 * | 12/2006 | Runcie | H04M 1/247 379/88.26 |
| 2007/0037536 | A1 * | 2/2007 | Battaglini | H04M 1/247 455/212 |
| 2010/0034366 | A1 * | 2/2010 | Basson | G10L 15/22 379/202.01 |
| 2010/0080382 | A1 * | 4/2010 | Dresher | H04M 1/6033 379/421 |
| 2013/0051543 | A1 * | 2/2013 | McDysan | H04M 3/42 379/202.01 |
| 2014/0004834 | A1 * | 1/2014 | Mian | G06F 3/017 455/414.1 |

(Continued)

*Primary Examiner* — Paul W Huber
(74) *Attorney, Agent, or Firm* — Ference & Associates LLC

(57) ABSTRACT

An embodiment provides a method, including: detecting, at a device, a primary speaker is providing audio input; detecting, at the device, a voice data link providing audio of the primary speaker to another speaker is muted; and providing a notification to the primary speaker that the voice data link is muted. Other aspects are described and claimed.

20 Claims, 3 Drawing Sheets

(56) References Cited

U.S. PATENT DOCUMENTS

| | | | | |
|---|---|---|---|---|
| 2014/0015952 A1* | 1/2014 | Guo | ........................ | H04M 3/42 |
| | | | | 348/78 |
| 2015/0085064 A1* | 3/2015 | Sanaullah | ............. | H04M 3/568 |
| | | | | 348/14.08 |
| 2015/0195411 A1* | 7/2015 | Krack | ................... | H04M 3/566 |
| | | | | 379/202.01 |

* cited by examiner

MUTED DEVICE NOTIFICATION

BACKGROUND

Currently, in addition to traditional telephones, many devices include a voice calling capability. Examples include smart phones, tablets and even more traditional computer form factors, e.g., a laptop or desktop computer running a VOIP application.

Commonly a user will want or need to mute his or her line. This may be accomplished in a purely local action, e.g., the client side device mutes an input component such as a microphone or functionality thereof, or this may be accomplished in a distributed fashion, e.g., a client side action such as a mute button press affects another device's functionality, e.g., muting accomplished on a centralized conference device.

BRIEF SUMMARY

In summary, one aspect provides a method, comprising: detecting, at a device, a primary speaker is providing audio input; detecting, at the device, a voice data link providing audio of the primary speaker to another speaker is muted; and providing a notification to the primary speaker that the voice data link is muted.

Another aspect provides a device, comprising: an output element; an input element; a processor operatively coupled to the input element and the output element; and a memory that stores instructions executable by the processor to: detect a primary speaker is providing audio input; detect a voice data link providing audio of the primary speaker to another speaker is muted; and provide a notification via the output element to the primary speaker that the voice data link is muted.

A further aspect provides a computer program product, comprising: a computer readable storage device having program executable code embodied therewith, the code being executable by a processor and comprising: code that detects, at a device, a primary speaker is providing audio input; code that detects, at the device, a voice data link providing audio of the primary speaker to another speaker is muted; and code that provides a notification to the primary speaker that the voice data link is muted.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
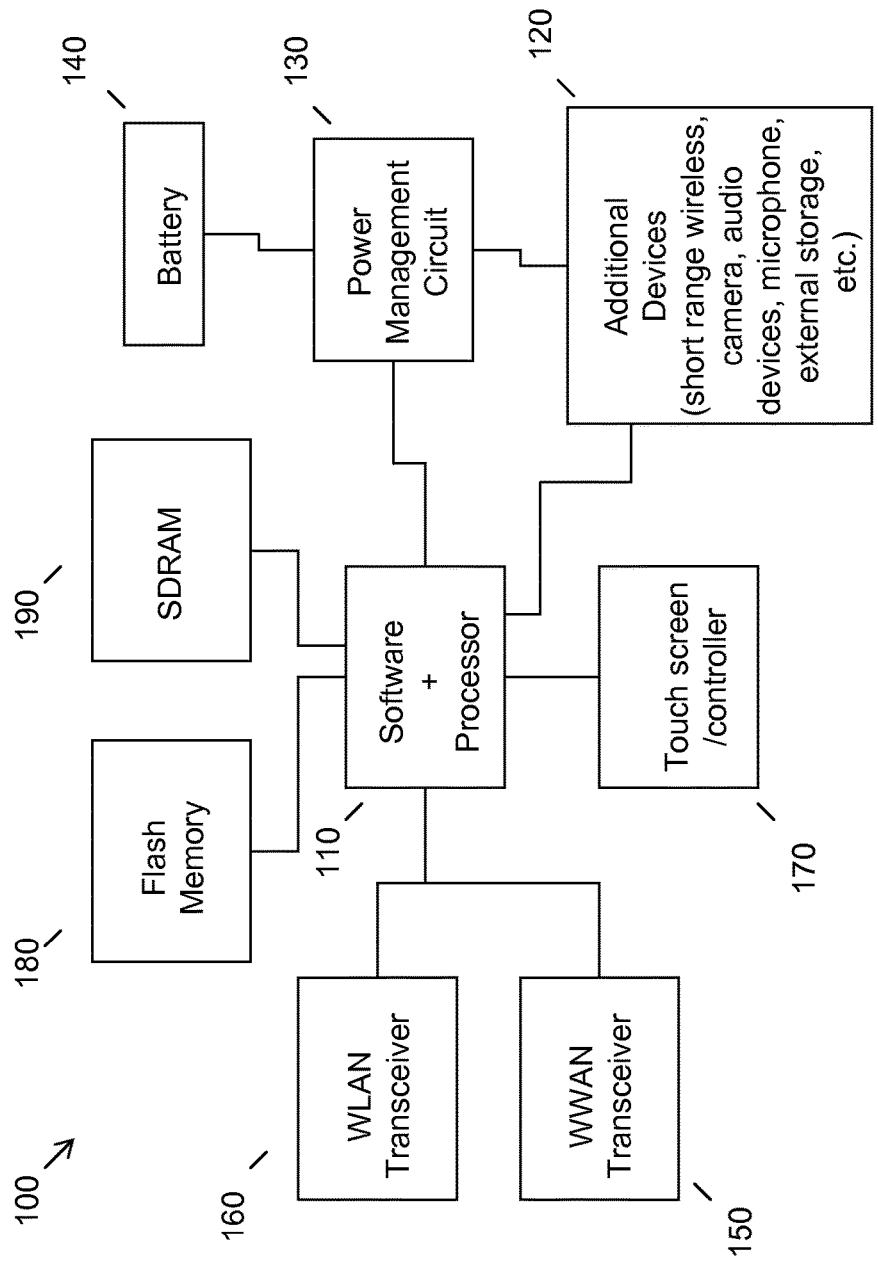
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A difficulty often arises where a user mutes his or her line but forgets or is unaware that the line has been muted. For example, considering a smart phone example, often a mute soft button may be activated inadvertently by user during the course of conversation. If the user is not attentive, he or she may not notice a visual notification, e.g., shading of the mute button, showing the mute button has been depressed. This leads to the user having the line muted while speaking, with voice data not being communicated to the receiving party. Often the only resolution is for the receiving part to infer what has happened and notify the user with the muted line. Thus, another call participant can speak to the user, making them aware the device was muted. This wastes time until the user realizes they are/were on mute. The user must also repeat what they said after un-muting and often it is not exactly clear when the muting happened.

Accordingly, an embodiment detects when a device is on mute when the primary or active speaker is talking. If the primary or active speaker is saying something while the device is muted, the device notifies the speaker of this muted condition. The notification may take a variety of forms, e.g., flashing of the screen, including turning on the screen if necessary, such that the muted primary speaker sees a problem. The notification may include a haptic effect, e.g., vibration of the device. The notification may include an audible notification such as playing an audio tone/clip, e.g., "phone muted". The notification may include a different visual indication, e.g., display of an on-screen message, etc. The notification may take a form in which a variety of modalities are used and/or the notification may be modified, potentially in a dynamic fashion, e.g., changing the notification in time such as being timed with detected voice input and/or increasing in intensity as the primary or active speaker voices further input while the line in muted.

Choosing an appropriate notification method may vary. For example, different notification modalities may be selected, e.g., depending on whether the user is looking at the screen (which may counsel flashing the screen), holding the device (which may counsel vibrating the device), sitting across the room (which may counsel playing an audible tone), on a short range wireless connection (e.g., BLUETOOTH earpiece or other paired device) (which may also counsel playing an audible tone), etc. Determining which speaker is speaking, i.e., is the primary or active speaker, may be accomplished in a variety of ways. For example, an embodiment may utilize one or more methods such as eye tracking, voice identification, pattern matching, e.g., via speaking level, background noise, etc.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system design found for example in tablet or other mobile computing platforms. Software and processor(s) are combined in a single unit 110. Processors comprise internal arithmetic units, registers, cache memory, busses, I/O ports, etc., as is well known in the art. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces, for example, include SDIO and I²C.

There are power management unit(s) 130, e.g., a battery management unit, BMU, which manages power as supplied, for example, via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., a microphone that may be used in connection with a voice call application, an image sensor such as a camera that may be used in biometric identification of a speaker, etc. System 100 often includes a touch screen 170 for data input and display/rendering. System 100 also typically includes various memory devices, for example flash memory 180 and SDRAM 190.

Figure 2:
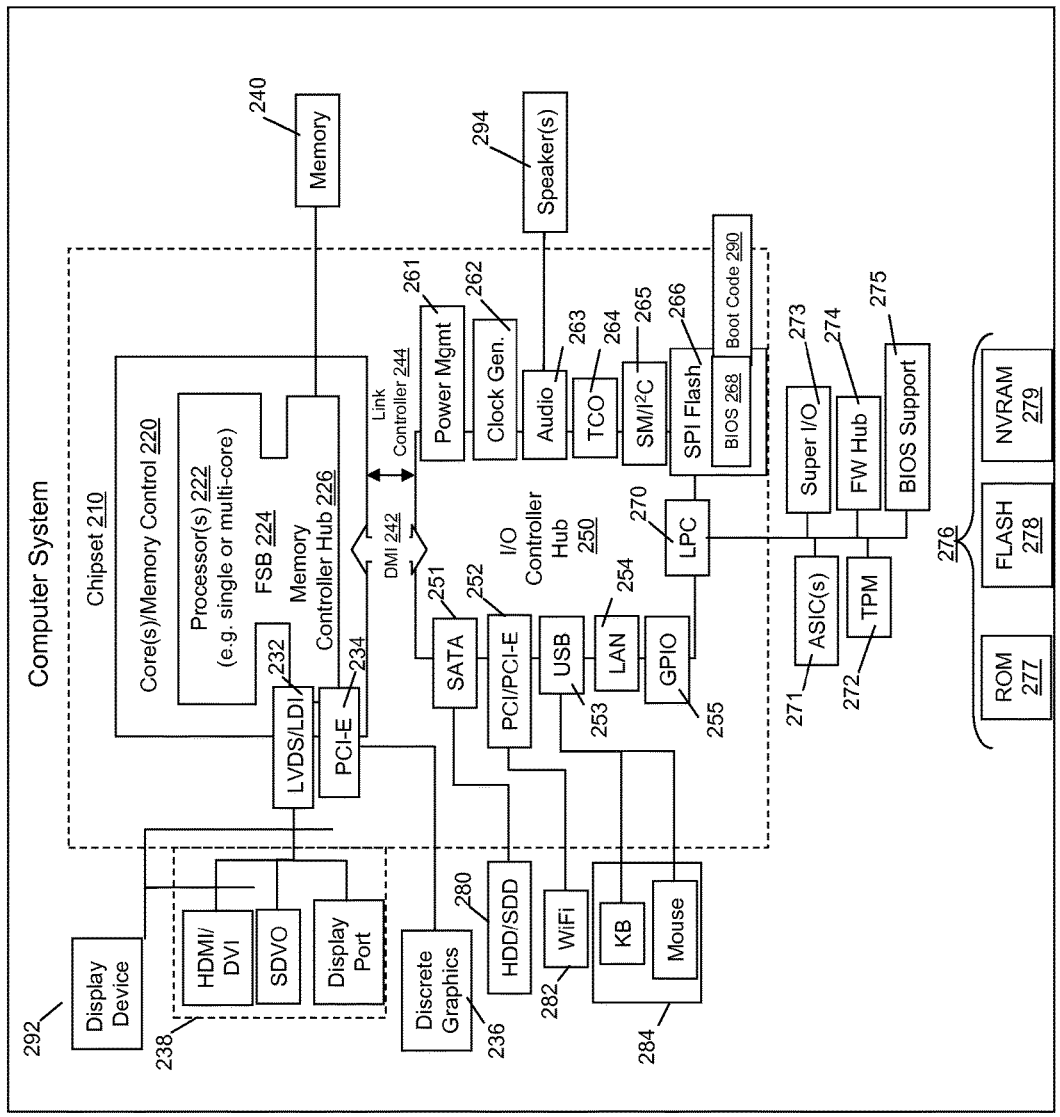
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 and/or FIG. 2, may be used in devices that are used in a voice call. Specifically the circuitry outlined in FIG. 1 and FIG. 2 (or some combination thereof) may be used in devices on which users make telephone calls, conference calls, VOIP calls and the like. In an embodiment, a notification that a user has muted his or her line is provided. This notification is an attempt to infer when the user has inadvertently muted his or her line, rather than a standard notification that is provided when the user mutes the line generally, e.g., changing a visual associated with a mute button as is conventionally known.

Figure 3:
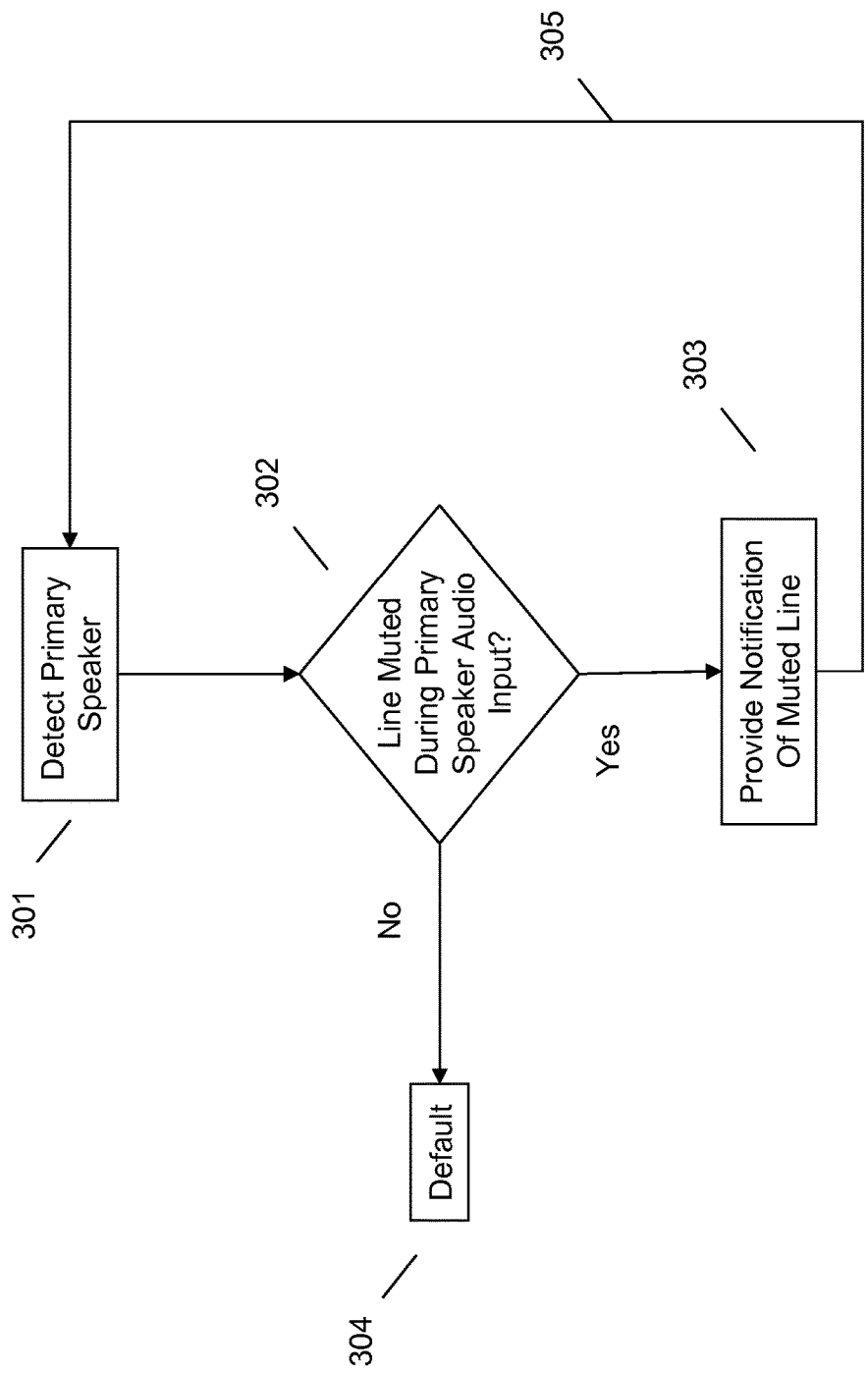
FIG. 3 illustrates method of providing a muted device notification.

By way of example, and referring to FIG. 3, an embodiment provides a method of notifying the user that a line has been muted. In an embodiment, a primary or active speaker is detected at 301, e.g., by the local device and/or by a connected device processing audio and/or image data collected by the local device (e.g., a conference call device). At the same time, it may be detected or determined, again by the local device and/or in a distributed fashion, if a voice data link providing audio of the primary speaker to another speaker is muted at 302. If so, an embodiment may provide a notification of the muted line condition to the primary speaker at 303, i.e., that the primary or active speaker is speaking but the voice data link is muted. Otherwise, i.e., if the line is not muted and/or the primary speaker is not providing audio, the default condition, e.g., muted line with no additional notification may be maintained at 304.

The detecting that the primary speaker is providing audio input at 301 may include simply detecting audio at a microphone of the local device or may further include more complex processing, e.g., speaker identification. Additionally, the detecting that the primary speaker is providing audio input at 301 may include identifying the primary speaker using a biometric identification of another type, e.g., use of image data captured by a camera to identify the primary or active speaker. Such identification may be used as a factor in determining if the primary or active speaker, versus another source of audio (e.g., machine produced audio/background noise) is detected at 301.

Additionally or in the alternative, other methods may be employed to infer that the primary or active speaker is providing audio input at 301. For example, a camera or like sensor may capture eye tracking data to infer that a user corresponding to a primary speaker is both looking at the device and providing audio input. Likewise, an embodiment may detect an orientation of the device, e.g., a holding orientation, along with audio input, such that it may be inferred that a primary speaker is providing audio input to a muted line.

The notification provided at 303 may take a variety of forms. For example, the notification may be selected from the group consisting of a visual notification, an audible notification, and a haptic notification, and/or the notification may be a combination of the foregoing. The choice of notification(s) provided may be made using factors such as those outlined for detecting a primary speaker. For example, if the user is holding the device but looking away from the device, a haptic or audible notification may be more appropriate than a visual notification.

Furthermore, as indicated by loop 305 of FIG. 3, the notification may be modulated. As an example, the notification may be modulated according to time associated with the providing of audio input by the primary speaker. That is, if the primary speaker is detected as continuing to provide audio while the line is muted after the notification (i.e., an initial notification) has been provided, an additional notification may be provided, e.g., a notification of modified intensity or using a different modality. Likewise, time may be used to modify the notification such that it is synchronized with the provision of audio data by the active speaker. Thus the notification may only occur in response to or in association with the time that the primary speaker is providing audio to a muted line.

Similarly, the notification may be modulated according to amplitude associated with the providing of audio input by the primary speaker. By way of example, if an audible notification is used, its amplitude may be selected based on the level or amplitude of noise in the local environment. In a similar way, the notification may be modulated according to identification of the primary speaker. Thus, if a given speaker is known to respond better to a particular notification modality, e.g., via knowledge gained from a stored user history, an embodiment may select a preferred notification modality. This concept may be generalized, e.g., notification modalities known to be effective generally to users or generally given certain conditions, e.g., the detection of a paired input device such as a BLUETOOTH earpiece may provide a factor for selecting an audible notification versus a visual notification, which may go unnoticed by a user remote from the primary device.

Accordingly, as described herein an embodiment provides an automated notification that a user is providing audio to a muted line. This notification may be localized such that only the primary or active speaker is provided with the notification and/or others, e.g., a receiving party, may be notified such that they may assist in alerting the muted speaker to the muted condition.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, at a device, that a primary speaker is providing audio input;
   detecting, at the device, a voice data link providing audio of the primary speaker to another speaker is muted;
   selecting, based on a preferred notification modality of the primary speaker, a notification from a plurality of notifications;
   providing the notification to the primary speaker that the voice data link is muted; and
   continuously modulating, after the providing and responsive to identifying that the audio input continues to be detected while the voice data link is muted, an aspect of the notification until the voice data link is unmuted.

2. The method of claim 1, wherein detecting the primary speaker is providing audio input comprises detecting audio at a microphone of the device.

3. The method of claim 1, wherein detecting the primary speaker is providing audio input comprises identifying the primary speaker using a biometric identification.

4. The method of claim 3, wherein the biometric identification includes use of image data.

5. The method of claim 1, wherein the notification is selected from the group consisting of a visual notification, an audible notification, and a haptic notification.

6. The method of claim 1, further comprising committing an action, responsive to said detecting the voice data link is muted, selected from the group of:
   prompting the primary speaker to un-mute the voice data link; and
   automatically un-muting the voice data link.

7. The method of claim 1, wherein the notification is modulated according to time associated with the providing of audio input by the primary speaker.

8. The method of claim 1, wherein the notification is modulated according to amplitude associated with the level of noise in a local environment.

9. The method of claim 1, wherein the notification is specific to the primary speaker.

10. The method of claim 1, further comprising:
    detecting a short range wireless paired input device;
    wherein the notification is selected according to the short range wireless paired input device.

11. A device, comprising:
    an output element;
    an input element;
    a processor operatively coupled to the input element and the output element; and
    a memory that stores instructions executable by the processor to:
    detect that a primary speaker is providing audio input;
    detect a voice data link providing audio of the primary speaker to another speaker is muted;
    select, based on a preferred notification modality of the primary speaker, a notification from a plurality of notifications;
    provide the notification via the output element to the primary speaker that the voice data link is muted; and
    continuously modulate, after the providing and responsive to identifying that the audio input continues to be detected while the voice data link is muted, an aspect of the notification until the voice data link is unmuted.

12. The device of claim 11, wherein the input element comprises a microphone and wherein to detect the primary speaker is providing audio input comprises detecting audio at the microphone.

13. The device of claim 11, wherein to detect the primary speaker is providing audio input comprises identifying the primary speaker using a biometric identification.

14. The device of claim 13, wherein the input element comprises a camera and wherein the biometric identification includes use of image data.

15. The device of claim 11, wherein the notification is selected from the group consisting of a visual notification, an audible notification, and a haptic notification.

16. The device of claim 11, wherein the instructions are further executable by the processor to commit an action, responsive to said detecting the voice data link is muted, selected from the group of:
    prompting the primary speaker to un-mute the voice data link; and
    automatically un-muting the voice data link.

17. The device of claim 11, wherein the notification is modulated according to time associated with the providing of audio input by the primary speaker.

18. The device of claim 11, wherein the notification is modulated according to amplitude associated with the level of noise in a local environment.

19. The device of claim 11, wherein the notification is specific to the primary speaker.

20. A computer program product, comprising:
    a computer readable storage device having program executable code embodied therewith, the code being executable by a processor and comprising:
    code that detects, at a device, that a primary speaker is providing audio input;
    code that detects, at the device, a voice data link providing audio of the primary speaker to another speaker is muted;
    code that selects, based on a preferred notification modality of the primary speaker, a notification from a plurality of notifications;
    code that provides a notification to the primary speaker that the voice data link is muted; and
    code that continuously modulates, after the providing and responsive to identifying that the audio input continues to be detected while the voice data link is muted, an aspect of the notification over until the voice data link is unmuted.

* * * * *